United States Patent Office 3,488,343
Patented Jan. 6, 1970

3,488,343
MONOAZO DYESTUFFS CONTAINING AN ACRYLYL OR BENZOYL FIBER-REACTIVE SUBSTITUENT
René de Montmollin, Riehen, and Alfred Fasciati, Bottmingen, Switzerland, assignors to Ciba Limited, Basel, Switzerland, a company of Switzerland
No Drawing. Filed Jan. 17, 1967, Ser. No. 609,743
Claims priority, application Switzerland, Feb. 8, 1966, 1,747/66
Int. Cl. C09b 29/30
U.S. Cl. 260—199       4 Claims

ABSTRACT OF THE DISCLOSURE

Fiber-reactive monoazo dyes which contain as fiber-reactive substituent an α-bromacrylyl or dinitrochlorobenzoyl group and γ-acid or N-methyl-γ-acid as coupling component; they dye cotton and above all wool pure red shades of excellent fastness properties.

---

The present invention provides dyestuffs, which in the form of free acids, correspond to the formula

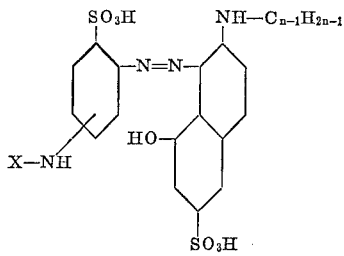

in which X represents an α-bromacrylic or a dinitrochlorobenzoyl grouping and $n$ is an integer of 1 or 2.

The present invention also provides a process for the manufacture of dyestuffs of the above formula which comprises (a) acylating a compound of the formula

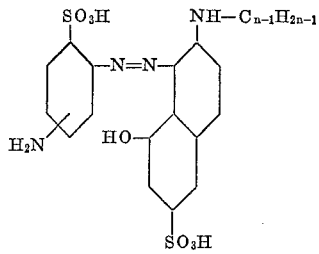

with an α-bromacrylic acid halide, α-bromacrylic acid anhydride or a dinitrobenzoyl halide, (b) diazotising a compound of the formula

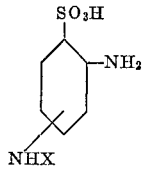

in which X has the meaning given above and coupling the diazo compound with a 2-alkylamino-8-hydroxynaphthalene-6-sulphonic acid of the formula

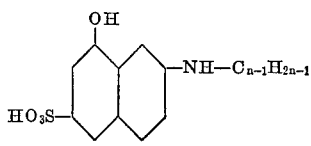

in which $n$ is 1 or 2 or (c) acylating a compound of the formula

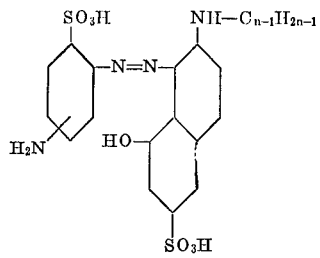

with an α,β-dibromopropionyl halide, eliminating hydrogen bromide from the α-bromacrylic derivative so obtained, diazotising the said derivatives and coupling the diazo compound with a 2-alkylamino-8-hydroxynaphthalene-6-sulphonic acid.

Acylation is advantageously carried out in the presence of an agent capable of binding acid, for example, sodium acetate, sodium hydroxide or sodium carbonate, and under comparatively mild conditions, for example, in an organic solvent or at a comparatively low temperature in an aqueous medium.

When an α,β-dibromopropionic acid halide, for example, the chloride, is used in the acylation process instead of α-bromacrylic acid chloride, α,β-dibromopropionyl derivatives are formed which can easily be converted into the α-bromacrylic dyestuffs of the invention by a treatment with an alkali, for example, with sodium carbonate or sodium hydroxide.

The dyestuffs obtainable by the process of the invention are new. They are suitable for dyeing and printing a very wide variety of materials, especially polyhydroxylated materials of fibrous structure, for example, cellulosic materials, including both man-made fibres, for example, regenerated cellulose fibres, and natural fibres, for example, linen or especially cotton. They are specially suitable for dyeing and printing leather and nitrogenous textile materials, for example, silk and especially wool and also polyamide and polyurethane fibres in a slightly alkaline, neutral or acid bath, for example, a bath acidified with acetic acid.

Dyeings produced on wool with the said dyestuffs display an excellent fastness to washing and to milling.

The following examples illustrate the invention. Unless otherwise stated, the parts and percentages are by weight.

EXAMPLE 1

402 parts of 5-(α,β-dibromopropionylamino)-1-aminobenzene-2-sulphonic acid are stirred in 800 parts of water; 250 parts of hydrochloric acid of 30% strength are added at 0 to 5° C. and diazotization is effected by the dropwise addition of 250 parts by volume of 4 N-sodium nitrite solution. A solution of 275 parts of the sodium salt of N-methyl-2-amino-8-hydroxynaphthalene - 6 - sulphonic acid in 1,000 parts of water is allowed to run into the diazo compound free from nitrous acid which is obtained. 400 parts by volume of 4 N-sodium acetate solution are then allowed to run in to complete coupling. After coupling, the pH of the dyestuff solution is adjusted to 12 by the addition of about 300 parts by volume of sodium hydroxide solution of 30% strength, the temperature being kept at between 15 and 20° C. by the addition of ice. The batch is stirred for 15 minutes at pH 12, whereupon it is neutralized to pH 7 by the addition of hydrochloric acid of 30% strength. The dyestuff is completely precipitated by the addition of 1,200 parts of sodium chloride, isolated by filtration, washed with a sodium chloride solution of 10% strength and then dried in vacuo at 70 to 80° C.

A blue-red powder is obtained which is soluble in water and which dyes wool bluish red tints possessing a high degree of fastness to wet treatments when applied in a dyebath acidified with acetic acid.

A similar dyestuff which dyes wool red tints with a somewhat more bluish cast is obtained when the 5-($\alpha,\beta$-dibromopropionylamino)-1-aminobenzene-2-sulphonic acid is replaced by 4-($\alpha,\beta$-dibromopropionylamino)-1-amino-2-sulphonic acid.

EXAMPLE 2

90 parts of the dyestuff of the formula

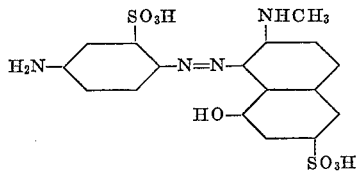

are neutralized in 1,000 parts of water with sodium carbonate, and then 20 parts of sodium hydrogen carbonate are added. 56 parts of $\alpha,\beta$-dibromopropionyl chloride are added dropwise at 5 to 10° C. in the course of one hour while stirring vigorously. After acylation, the pH of the dyestuff solution is adjusted to 12 by the addition of sodium hydroxide solution of 30% strength, the temperature being kept below 15° C. by the addition of ice. The batch is stirred for 15 minutes and then neutralized to pH 7 by the addition of hydrochloric acid of 30% strength. The dyestuff is then completely precipitated by the addition of sodium chloride, isolated by filtration, washed with a sodium chloride solution of 15% strength and then dried in vacuo at 70 to 80° C. A blue-red powder is obtained which is soluble in water and which dyes wool bluish red tints possessing a high degree of fastness to wet treatments.

EXAMPLE 3

90 parts of the dyestuff of the formula

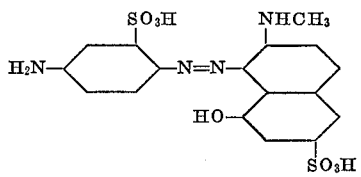

are neutralized in 1,000 parts of water with sodium carbonate, and then 20 parts of sodium hydrogen carbonate are added. 38 parts of $\alpha$-bromacryloyl chloride are added dropwise at 5 to 10° C. in the course of one hour while stirring vigorously. After acylation, the dyestuff is completely precipitated by the addition of sodium chloride, the reaction mixture is filtered, the filter cake is washed with a sodium chloride solution of 15% strength and then dried in vacuo at 70 to 80° C. A blue-red powder is obtained which is soluble in water and which dyes wool bluish red tints possessing a high degree of fastness to wet treatments.

EXAMPLE 4

90 parts of the dyestuff of the formula

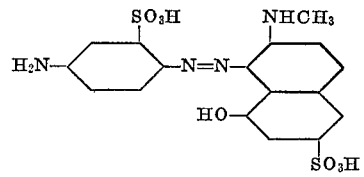

are neutralized in 1,000 parts of water with sodium carbonate, and then 20 parts of sodium hydrogen carbonate are added. A solution of 60 parts of 3,5-dinitro-4-chlorobenzoyl chloride in 300 parts of acetone is added dropwise at 5 to 10° C. in the course of one hour while stirring vigorously. After acylation, the dyestuff is completely precipitated by the addition of sodium chloride, isolated by filtration, washed with a sodium chloride solution of 15% strength and then dried in vacuo at 70 to 80° C. A blue-red powder is obtained which is soluble in water and which dyes wool bluish red tints possessing a high degree of fastness to wet treatments.

Dyeing prescription 2 parts of the dyestuff obtained in the manner described in Example 1 are dissolved in 4,000 parts of water. 10 parts of sodium sulphate crystals are added, and then 100 parts of well wetted wool are entered into the dyebath so obtained at 40 to 50° C. 2 parts of acetic acid of 40% strength are added, the dyebath is raised to the boil in the course of 30 minutes and dyeing is carried out for ¾ hour at the boil. The wool is then rinsed with cold water and dried. The wool is dyed a red tint which is fast to washing and which possesses a good fastness to light.

We claim:
1. Monoazo dyestuffs which, in the form of free acids, correspond to the formula

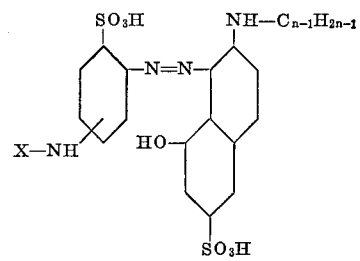

in which X represents a member selected from the group consisting of the $\alpha$-bromacrylyl and the dinitrochlorbenzoyl grouping bound to NH by the co-group and $n$ in an integer up to and including 2.

2. The dyestuff according to claim 1, which corresponds to the formula

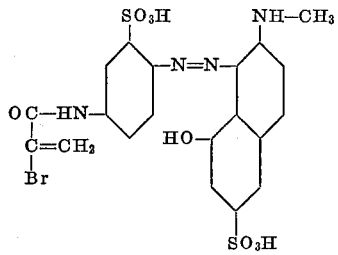

3. The dyestuff according to claim 1, which corresponds to the formula

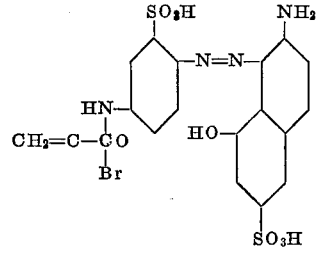

4. The dyestuff according to claim 1, which corresponds to the formula

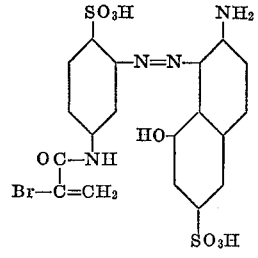

(References on following page)

References Cited

UNITED STATES PATENTS

| | | | |
|---|---|---|---|
| 2,374,157 | 4/1945 | Kualnes | 260—199 |
| 3,316,239 | 4/1967 | Riat et al. | 260—199 X |

FOREIGN PATENTS

| | | |
|---|---|---|
| 845,567 | 8/1960 | Great Britain. |

CHARLES B. PARKER, Primary Examiner

DONALD M. PAPUGA, Assistant Examiner

U.S. Cl. X.R.

8—13, 41, 51, 54.2, 55; 260—198